United States Patent [19]
Graton et al.

[11] Patent Number: 5,433,666
[45] Date of Patent: Jul. 18, 1995

[54] TORSION DAMPING DEVICE WITH A DYNAMIC VIBRATION DAMPER, IN PARTICULAR FOR AUTOMOTIVE VEHICLES

[75] Inventors: Michel Graton, Paris; Michel Gizard, Le Port Marly, both of France; Roger Carmillet, Franklin, Mich.

[73] Assignee: Valeo, Paris, France

[21] Appl. No.: 982,044

[22] Filed: Nov. 25, 1992

Related U.S. Application Data

[63] Continuation of Ser. No. 915,753, Jul. 21, 1992, abandoned, which is a continuation of Ser. No. 515,436, Apr. 27, 1990, abandoned.

[30] Foreign Application Priority Data

Apr. 28, 1989 [FR] France ................... 89 05638

[51] Int. Cl.⁶ .................. F16D 3/14; F16D 13/58; F16F 15/12
[52] U.S. Cl. .................... 464/68; 74/574; 192/106.2
[58] Field of Search .................. 464/63–68, 464/81, 85; 192/106.1, 106.2, 30 V; 74/574

[56] References Cited

U.S. PATENT DOCUMENTS

| | | | |
|---|---|---|---|
| 3,414,101 | 12/1968 | Binder et al. | 464/63 X |
| 4,496,036 | 1/1985 | Loizeau | 192/106.2 |
| 4,549,642 | 10/1985 | Loizeau | 464/85 X |
| 4,560,054 | 12/1985 | Kayanoki et al. | 464/66 X |
| 4,634,398 | 1/1987 | Alas | 464/68 |
| 4,693,354 | 9/1987 | Umeyama et al. | 464/85 X |
| 4,698,045 | 10/1987 | Billet | 464/68 |
| 4,791,829 | 12/1988 | Fukushima et al. | 74/574 |
| 4,883,156 | 11/1989 | Rohrle | 192/106.2 |

FOREIGN PATENT DOCUMENTS

| | | |
|---|---|---|
| 0304159 | 2/1989 | European Pat. Off. . |
| 1207848 | 2/1960 | France . |
| 2597181 | 10/1987 | France . |
| 3609048 | 10/1986 | Germany . |
| 58-14257 | 3/1983 | Japan .................... 74/574 |
| 2157398 | 10/1985 | United Kingdom . |

OTHER PUBLICATIONS

Japanese Abstract from Japanese Patent No. 59-69549, Apr., 1984, Toki.

*Primary Examiner*—Daniel P. Stodola
*Attorney, Agent, or Firm*—Longacre & White

[57] ABSTRACT

A torsion damping device comprising guide rings, a damper plate, and a hub which is secured to a driven shaft for rotation of the latter therewith. The device includes a dynamic vibration damper attached to the hub, with this damper including a weight which is joined through a block of elastic material to a support. This support in turn is joined to the hub for rotation with the latter after a clearance has been taken up.

7 Claims, 4 Drawing Sheets

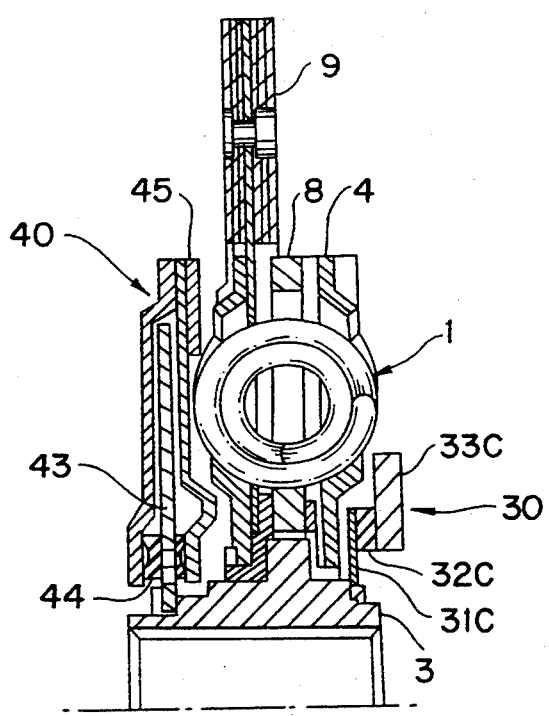
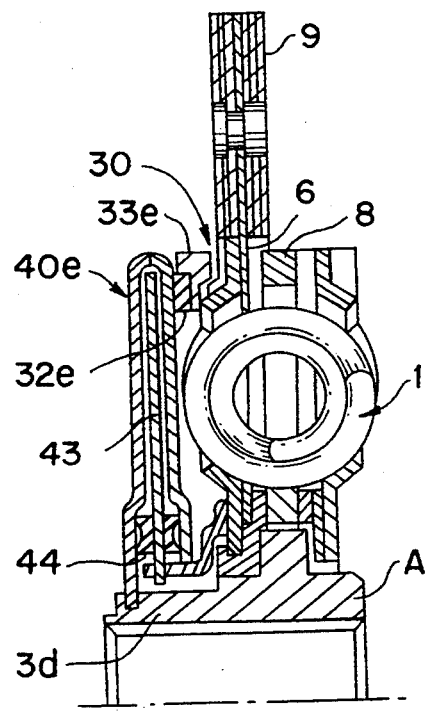
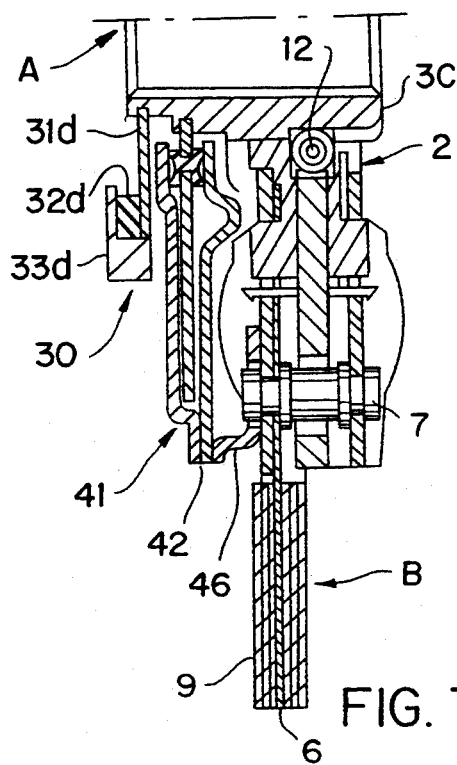
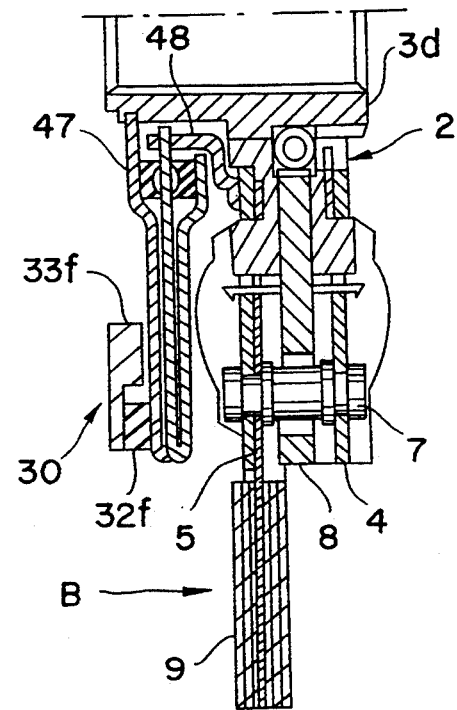

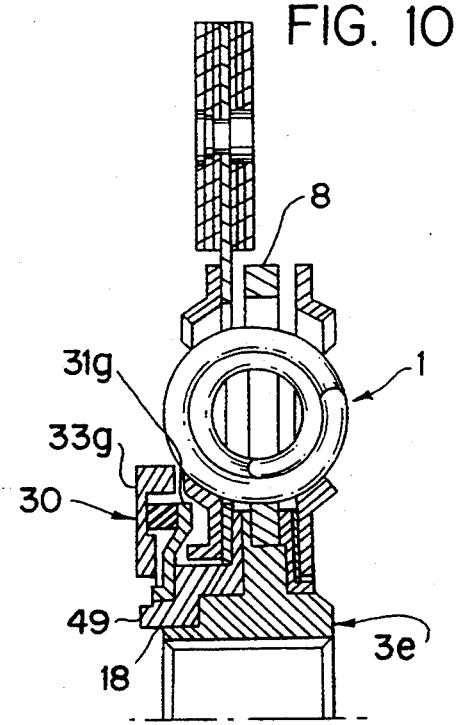
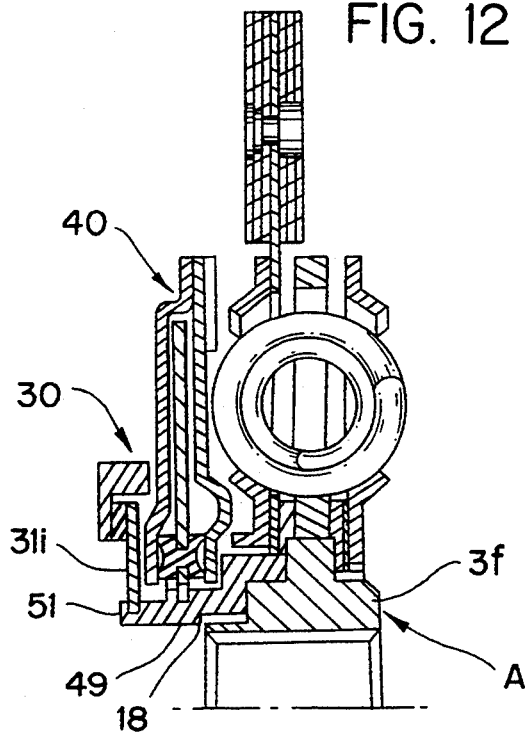
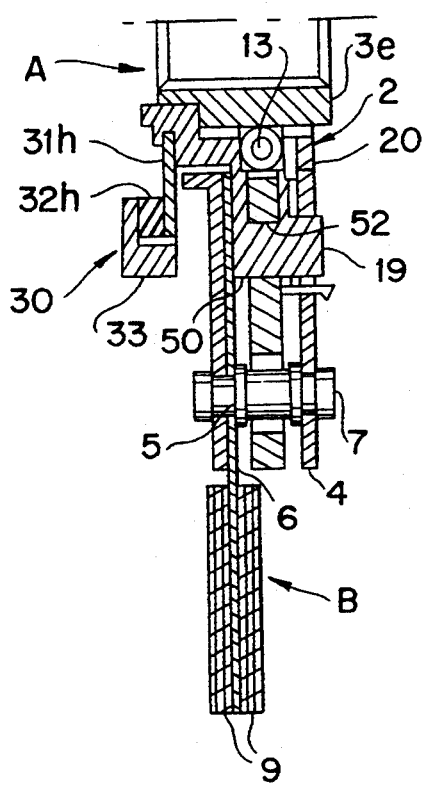
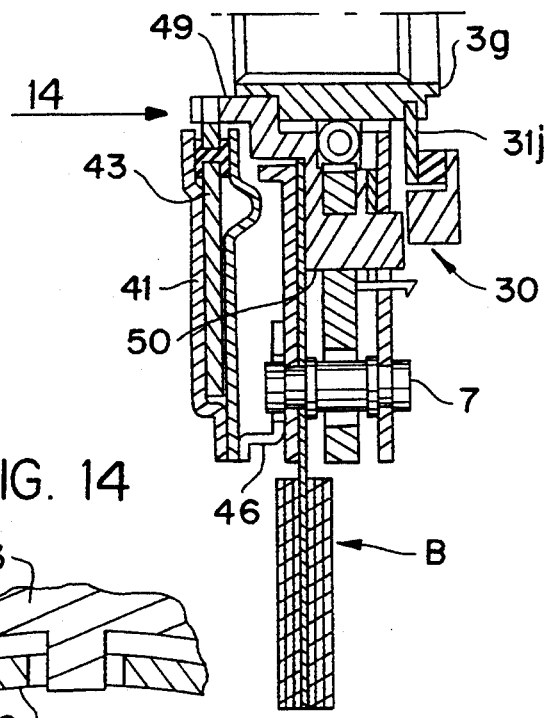
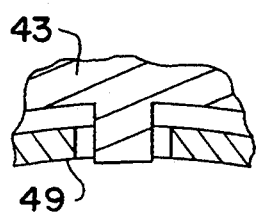

TORSION DAMPING DEVICE WITH A DYNAMIC VIBRATION DAMPER, IN PARTICULAR FOR AUTOMOTIVE VEHICLES

This is a continuation of application Ser. No. 07/915,753, filed Jul. 21, 1992, abandoned, which is a continuation of application Ser. No. 07/515,436, filed Apr. 27, 1990, which was abandoned upon the filing hereof.

FIELD OF THE INVENTION

This invention relates to torsion damping devices, in particular for automotive vehicles, such a device being of the kind comprising two coaxial parts which are mounted for movement of one with respect to the other within the limits of a predetermined angular displacement and against the action of circumferentially acting resilient means and against the action of damping means.

BACKGROUND OF THE INVENTION

Conventionally, one of the said parts comprises two guide rings which are arranged on either side of a damper plate which is part of the other one of the two said parts. The damper plate or the guide rings are secured to a hub for rotation therewith, with, optionally, a facility for an initial clearance to be taken up before rotation witch the hub takes place.

As is well known, in engines of the reciprocating type, in which the power output is delivered in the form of periodic impulses, due to the expansion of a gas against pistons which actuate a crankshaft by means of connecting rods, the variations in engine torque and inertia torque arising from the various components of the engine which are set in reciprocating motion usually make it necessary to provide a flywheel in order to smooth out the speed.

In order to reduce the vibrations which occur, in particular in the region of the pressure plate of the clutch when the latter is being disengaged, the published patent application No. DE 3 609 048A of the Federal Republic of Germany proposes to equip the flywheel with a dynamic vibration damper. This damper is effective in the frequency range which includes the resonant frequency of the pressure plate when the latter is not in gripping engagement with the friction disc of the clutch.

Such an arrangement is well adapted for damping out engine vibrations, and in particular the axial vibrations of the crankshaft. However, it is not entirely satisfactory: it does not allow the natural frequencies in torsion of the whole of the kinematic transmission train which couples the engine to the road wheels, and which includes the gearbox, to be suppressed. Accordingly, it does not allow the critical vibrations which occur in the region of the resonant frequency of the transmission train to be eliminated in certain vehicles at given engine speeds when the clutch is engaged. In addition, such a damper is arranged to extend over a circumference of large diameter, so that it is necessary to provide some suitable means preventing its mass from flying off under the effect of centrifugal force. Besides which, this arrangement requires modification of the reaction plate or flywheel of the clutch.

It has also been proposed, in United Kingdom published patent application GB 2 157 398A, to suppress the vibrations when the engine is in an idling mode, that is to say when the transmission is not under load, this being achieved by means of a mass which is welded on to a support mounted on the hub by means of a friction coupling. This particular arrangement is not adapted to remove the critical vibrations which occur under load when the clutch is engaged, in certain vehicles in the vicinity of a resonant frequency, for example at engine speeds of 1500 to 2800 rev/min which are lower than the maximum engine speed.

In order to overcome this problem, it might be thought possible to increase the mass of the reaction plate. This is however not satisfactory, since it leads to an increase in fuel consumption of the vehicle and to a reduction in performance, in terms of its ability to accelerate.

It could also be supposed that the engine torque might be reduced. This is no more satisfactory.

DISCUSSION OF THE INVENTION

An object of the present invention is to overcome these disadvantages, and thereby to provide a dynamic vibration damper which is capable of effectively reducing the vibrations while requiring the smallest possible modification to the associated mechanism such as a clutch; and to produce other advantages.

In accordance with the invention, there is provided a torsion damping device, in particular for automotive vehicles, of the kind comprising two coaxial parts which are mounted for movement of one with respect to the other within the limits of a predetermined angular displacement and against the action of resilient means and against the action of a damping means, with one of the said coaxial parts being fixed with respect to a driving shaft for rotation therewith and comprising two guide rings which are disposed on either side of a damper plate constituting part of the other one of the said coaxial parts, the damper plate or the guide rings, being fixed to a hub for rotation therewith, optionally after a clearance has been taken up, the hub being fixed with respect to a driven shaft for rotation of the driven shaft with the hub, wherein a dynamic vibration damper is attached to the hub, and wherein the torsion damping device is characterised in that the said dynamic damper includes a weight which is connected by means of at least one resilient element to a support which is coupled to the hub, for rotation with the hub, optionally after a clearance has been taken up, and in that the natural frequency of the said dynamic vibration damper is adapted to the resonant frequency of the torsion damper mounted on the driven shaft.

By virtue of this arrangement, the mass of the dynamic vibration damper (sometimes called a dynamic absorber) can be adapted, for example, in the context of a friction clutch, to the inertia of the gearbox, in such a way that there is no need to provide any retaining means for this mass, and also so that the critical vibrations that occur in the transmission train between the engine and the road wheels at the said resonant frequency are attenuated. The natural frequency of the dynamic vibration damper is then determined by the resonant frequency of the torsion damper mounted on its driven shaft.

It will be appreciated that this arrangement leaves the flywheel of the clutch intact, and that the dynamic vibration damper is easily mountable on a conventional friction clutch. In addition, it is arranged in a cooler zone.

The resilient element may be in the form of a block of elastic material, chosen so that its inherent damping ability is favourable to the suppression of the vibrations. In a modification, it may take the form of a spiral spring having an arm carrying the working mass and being joined to an internal carrying element constituting the said support.

In accordance with a first embodiment of the invention, the support of the said damper may be mounted directly on the hub to which it is secured, for example by crimping. In a further modification it may be mounted on an intermediate member which is itself secured to the hub.

In a third embodiment, the support may be secured to a bearing which is coupled with the hub for rotation therewith, optionally after a clearance has been taken up. This arrangement enables a conventional torsion damping device to be modified as little as possible.

In accordance with a major feature of the invention, the dynamic vibration damper is associated with a viscous damping device. This enables the damping effect of the viscous damping device to be improved in the region of the resonant frequency, so that the vibrations will be suppressed more effectively.

The description which follows, which is given by way of example only, illustrates the invention in the context of a friction clutch for automotive vehicles, with reference to the accompanying drawings.

BRIEF DESCRIPTION OF THE DRAWINGS

FIGS. 6 to 13 are views similar to FIGS. 1 and 2, but show various examples of these further embodiments that include viscous damping means.

FIG. 14 is a partial detail section as viewed along arrow 14 in FIG. 13.

DESCRIPTION OF PREFERRED EMBODIMENTS OF THE INVENTION

Figure 1:
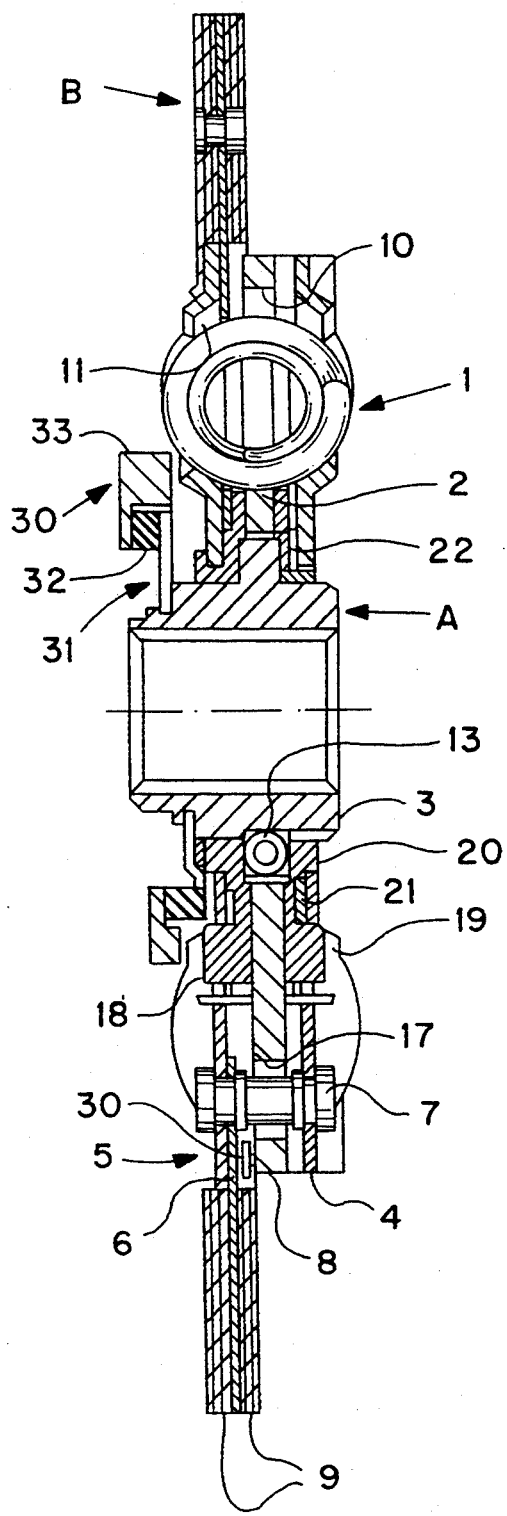
FIG. 1 is a view in axial cross section of a torsion damper in accordance with the invention, showing two alternative forms of dynamic vibration damper.

In the embodiments shown in the drawings, the friction clutch comprises two coaxial clutch parts A and B, which are mounted for mutual relative rotation within the limits of a predetermined angular displacement and against the action, both of circumferentially acting resilient means 1 and of a damping means 2.

The clutch part A is a passive or driven part of the clutch. It comprises a hub 3 which has an internal bore which is splined for mounting on the input shaft of the gearbox BV (FIG. 4), so as to drive this input shaft in rotation. The clutch part B, which is the active or driving part of the clutch, comprises two guide rings 4 and 5 which are connected together in spaced apart relationship by means of axial spacers 7, which in this example are in the form of spacer bars. The guide rings 4 and 5 are mounted for free rotation around the hub 3.

The guide ring 5 carries a clutch disc 6 which is fitted with friction liners 9, the clutch disc 6 being connected with the guide rings 4 and 5 by means of the spacer bars 7. The clutch disc 6 is laid against the guide ring 5 and secured to the latter by the spacer bars 7. The driving clutch part B is coupled with the internal combustion engine M (FIG. 4) of the vehicle, so as to be rotated by the engine. This coupling is achieved in the usual way by gripping of the friction liners 9 between the pressure plate and reaction plate of the clutch, neither of which is shown.

Windows 10 and 11 are formed respectively in a damper plate 8 and in the guide rings 4 and 5. The above mentioned circumferentially acting resilient means 1 consist, in this example, of coil springs which are mounted without any clearance in the windows 11 and, optionally with a clearance, also in the windows 10 so that the springs 1 can act in stages.

Figure 3:
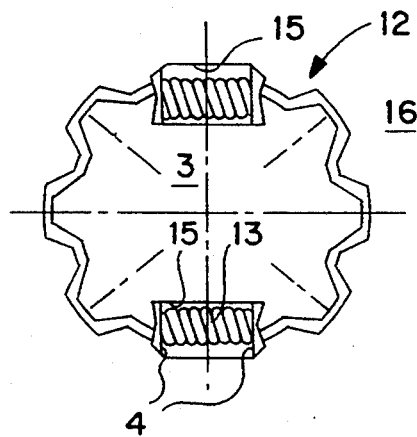
FIG. 3 is a simplified view showing the arrangement of resilient means of low stiffness which, in FIG. 1, are mounted between the hub and the damper plate of the torsion damper.

The damper plate 8 is mounted for rotational movement with respect to the hub 3, by means of a loose coupling means 12 and resilient means 13 of low stiffness, mounted between the damper plate 8 and hub 3. In this example the resilient means 13 are in the form of coil springs as generally described in French published patent application No. FR 2 560 329A. In the present example, as illustrated in FIG. 3, the loose coupling means 12 comprise firstly a plurality of trapezoidal teeth and secondly a plurality of complementary recesses. Each of these teeth extends, with a circumferential clearance, into a corresponding one of the recesses. The teeth and recesses are formed partly on the inner periphery of the damper plate 8 and partly in a flange 16 which constitutes a thickened portion of the outer periphery of the hub 3. On each of the members 3 and 8, the teeth and recesses alternate with each other. The springs 13 are of lower stiffness than the springs 1. In this example there are two springs 13, diametrically opposed to each other and mounted partly in slots 15 formed in the damper plate 8 and partly in similar slots in the flange 16 of the hub 3. Thrust inserts 14 are provided between the ends of the springs 13 and the end thrust surfaces of the slots 15.

The damper plate 8 is arranged axially between the guide rings 4 and 5, and has apertures 17 through which the spacer bars 7 extend.

The friction means 2 comprise an annular centring bearing 18 with an L-shaped cross section, which is inserted so as to extend axially between the damper plate 8 and the clutch disc 6, by virtue of a transverse portion of the bearing that acts as a spacer. The bearing 18 extends radially between the outer periphery of the hub 3 and the inner peripheral surface of the guide ring 5 by virtue of an axial locating portion of the bearing that carries the bearing surface itself, freely engaging around the hub 3. This bearing 18 is preferably made of fibre reinforced plastics material. It may however alternatively be made of a metal, for example of bronze.

A friction ring 19 is inserted axially between the damper plate 8 and the guide ring 4. It is preferably made of a plastics material, and is provided with bosses which are engaged in corresponding holes formed in the guide ring 4, so as to couple the ring 19 in rotation with the latter. The two guide rings 4 and 5 are of a standard type. The bearing 18 also has similar bosses, which are engaged in corresponding holes formed in the guide ring 7 and in the clutch disc 6, so that the bearing is thereby coupled for rotation with them (FIG. 1).

Another bearing 20, again having an L-shaped cross section, is inserted so as to extend radially between the guide ring 4 and the hub 3, and axially between the guide ring 4 and the flange 16. The bearing 20 is rotatable with the guide ring 4, by virtue of bosses, each of which is engaged in a respective one of a set of complementary recesses formed in the guide ring 4.

A resilient biassing ring 21 is associated with the friction ring 19. The resilient ring 21, which is in the form of a Belleville ring, bears on the guide ring 4 so as to urge the friction ring 19 towards the damper plate 8, and so as also to cause the bearing 18 to be gripped between the damper plate 8 and the guide ring 5. Similarly, a second resilient biassing ring 22 is associated with the bearing 20, with the ring 22 bearing axially on the guide ring 4 and urging the bearing 20 axially towards the flange 16.

The clutch disc 6, with its friction liners 9, is thus coupled with the hub 3 via two torsion damping devices. One of the latter, which will be called the main damper, comprises the springs 1 together with the members 18, 19 and 21, while the other damper, which will be called the predamper, comprises the springs 13, the loose coupling means 12 and the bearing 20 with its associated ring 22.

In a first stage of the angular displacement between the clutch disc 6 and the hub 3, the guide rings 4 and 5 are fixed with respect to the damper plate 8, to the extent that the clearance defined by the loose coupling means 12 has not yet been taken up and the springs 13 are compressed, while the bearing 20 transmits the appropriate forces. Once the clearance in the loose coupling means has been taken up under load, the damper plate 8 becomes displaced with respect to the guide rings 4 and 5, against the action of the springs 1 and the damping means 2. The springs 13 then remain in their compressed state.

A dynamic vibration damper or absorber 30 is linked with the hub 3. The absorber 30 comprises a weight 33 which is connected through at least one resilient element 32 to a support 31. The support 31 is coupled with the hub 3 for rotation with the hub. In some embodiments, as will be seen, a clearance is provided which must be taken up before the support 31 rotates with the hub. The natural frequency of vibration of the dynamic vibration damper 30 is adapted to the resonant frequency of the torsion damper mounted on the driven shaft. The natural frequency of the damper 30 is thus close to this resonant frequency.

In FIG. 1, the support 31 is fastened directly to the hub 3, in this example by a force fit as will be described below, and by crimping. The support 31 is made of metal, and in a modification it may be screwed to the hub. The weight 33 lies radially inward of the median axis of the springs 1, level with the radially inner part of the springs. It is annular in shape and its inner periphery is provided with a radial flange for securing the weight to the resilient element 32, which consists of a block of elastic material, for example an elastomer. This block 32 has a natural damping effect so as to suppress the vibrations, and it is fastened not only to the weight 33 but also to the support 31.

The natural frequency of the damper 30 depends on the particular application, and in particular on the gearbox, and is chosen so as to be close to, and therefore adapted to, the natural frequency of the friction clutch mounted on the driven shaft. This natural frequency depends in addition on the springs 1, which act under load when the clutch is engaged, and also on the hub 3, damper plate 8, guide rings 4 and 5, clutch disc 6 and friction liners 9.

In FIG. 1, the block 32 is of an annular shape, like the weight 33, as is also the support 31. The block 32 may be divided into a plurality of distinct parts. In another modification it may for example be in the shape of an annular comb. In this example, the block 32 is adhesively secured both to the weight 33 and to the support 31.. This is achieved by in situ vulcanisation of an appropriate rubbery mass between the weight 33 and the support 31.

The support 31 has a plurality of teeth on its inner periphery, and is harder than the hub 3. It is secured against rotation on the hub 3 by being force fitted into the hub, with the teeth of the support 31 making indentations in the hub 3. It is secured against axial movement on the hub by being crimped to the latter. In a modification, the block 32 is secured to the weight 33 and also to the support 31 by application of an adhesive material, or in any other suitable way.

Figure 5:
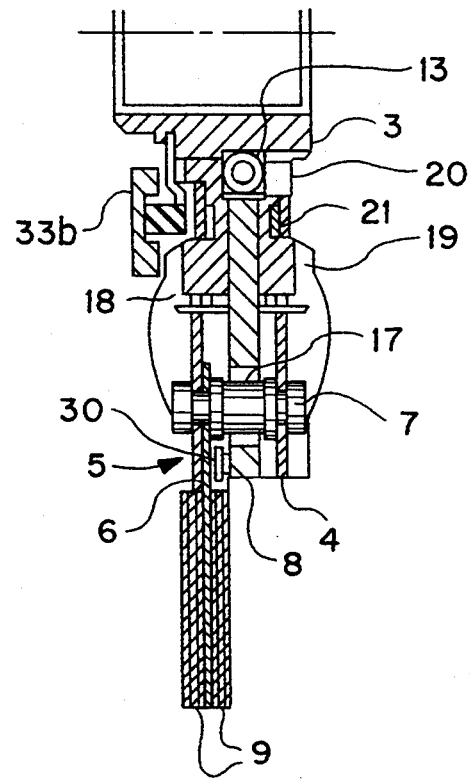
FIG. 5 is a view similar to FIG. 1 for another embodiment.

In FIG. 5, a modified form of dynamic vibration damper is shown in which the weight 33b has a central opening for the block 32b to be secured in the block 32b. In this case the support 31b has a cranked or serpentine form which allows it to lie as close as possible to the guide ring 5, so that the axial bulk of the assembly is reduced. This cranked form is given by an axial displacement of the outer periphery of the support 31b towards the guide ring 5.

Figure 2:
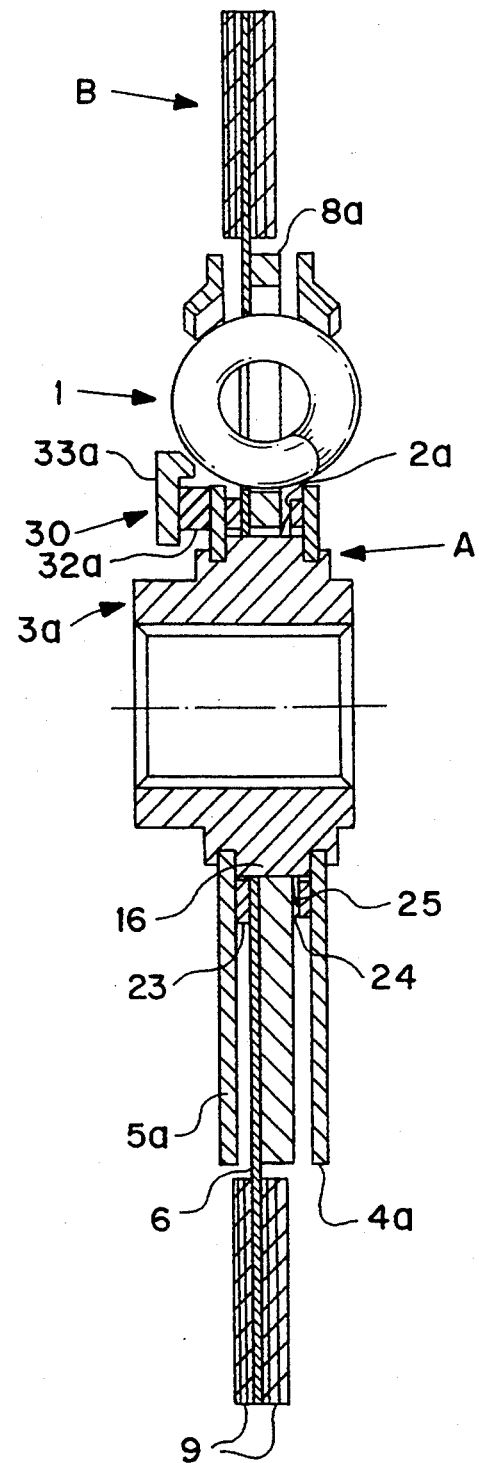
FIG. 2 is a view similar to FIG. 1, but showing another embodiment of the invention.

In the embodiment shown in FIG. 2, the guide rings 4a and 5a are secured directly to the hub 3, in this example by crimping. The damper plate 8a is mounted on the hub 3a so as to rotate freely with respect to the hub 3a, and carries the clutch disc 6 with its friction liners 9. The loose coupling means 12, with its optional clearance, is absent from this embodiment.

Advantage is taken of this arrangement to secure the block 32a directly on to the guide ring 5a. The weight 33, which is annular in shape like the guide rings 4a and 5a and the damper plate 8a, has on its outer periphery a chamfered portion to give it enough clearance to be displaced in vibration at the level of the springs 1. The weight 33a may, in this example again, be divided into a plurality of separate parts.

In a modification, it is the damper plate 8 which constitutes the support for the block 32 and the mass 33, the dynamic damper then being disposed between the two guide rings 4 and 5.

Figure 4:
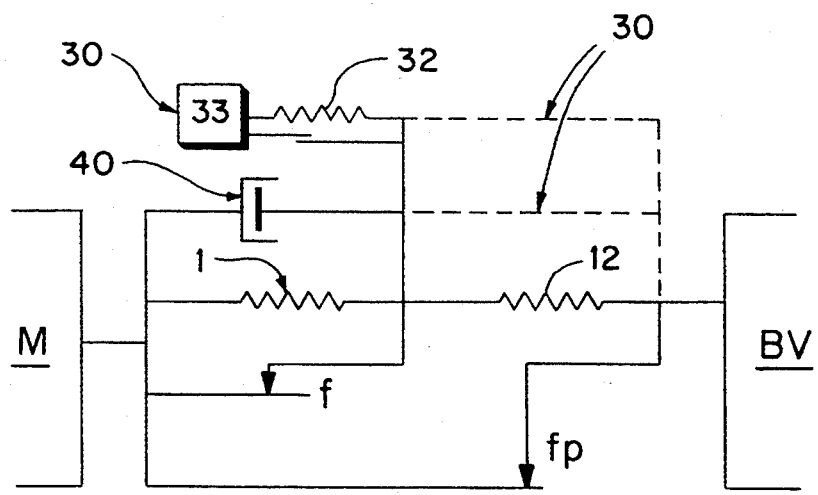
FIG. 4 is a diagram in which the association of the dynamic vibration damper with a viscous damping means, is indicated, so as to illustrate in general terms a group of further embodiments of the invention.

In the arrangement shown diagrammatically, in general terms, in FIG. 4 and in specific examples in FIGS. 6 to 13, the dynamic damper (or dynamic absorber) is associated with a viscous damping device. This device is confined within a sealed chamber. This chamber is filled with a viscous fluid, and in particular a fluid of the "non Newtonian" type, which is characterised by good stability of its viscosity with variation in temperature, and a dynamic viscosity which reduces as a function of the speed gradient. An example of such a fluid is a silicone. This arrangement enables the damper to act on the device in such a way as to suppress the vibrations more rapidly.

In the diagram of FIG. 4, various possible positions of the damper 30 are shown, together with the springs 1 and 13 which are indicated symbolically. The references f and fp correspond respectively to the frictional action of the main damper and the frictional action of the predamper, the block 32 being indicated diagrammatically with its stiffness and its internal damping effect.

Referring now to FIGS. 6 and 7, in this embodiment the vibration damper 30 is arranged, as in the other Figures, outside the volume delimited by the guide rings 4 and 5. In FIG. 6, the vibration damper 30, comprises the weight 33c, the resilient element 32c and the support 31c and is arranged at the end of the hub 3c which is at the right of the Figure. The viscous damping device 40 is disposed at the level of the left hand end of the hub 3c, again outside the volume delimited by the guide rings 4 and 5, and generally in the manner described in French patent application No. 89 01388.

The device 40 lies wholly within a housing 41, which comprises two housing parts 42 and 43, arranged to be moveable circumferentially with respect to each other. The first housing portion 42 comprises two face plates, which are generally spaced apart from each other but which are mated together at their outer periphery and secured to a carrier plate 45, by means of fastening members such as rivets or bolts.

The second housing part 43 comprises a disc which is disposed between the two face plates of the first housing part 42. A seal 44 is provided at the internal periphery of the disc 43 for sealingly closing the housing 41. The seal 44 cooperates frictionally with the two face plates of the housing 41. The disc 43 is secured by crimping it to the hub 3. The plate 45 has tabs 46 which are engaged on the heads of the spacer bar 7, so as to fasten the housing 41 to the guide rings 4 and 5 for rotation with the guide rings 4 and 5.

The housing 41 is thus carried by the hub 3c, while the tabs 46 and the spacer bars 7 constitute a mutual engagement means between the guide rings 4 and 5 on the one hand and the housing part 42 on the other. It is of course possible to locate the damper 30 comprising the weight 33d, the resilient element 32d and the support 31d, on the same side of the clutch as the damping device 40, as is shown in FIG. 7.

Referring now to FIGS. 8 and 9, the viscous damping device 40e here comprises a housing 41e in the form of two half shells, one of which has at its inner periphery a radial extension 47 which is secured by crimping it to the hub 3d. The disc 43e is connected to the guide rings 4 and 5 for rotation therewith, but the mutual engagement means in this embodiment comprise a member 48 which is fastened by welding to the guide ring 5. The member 48 has tenons to give axial orientation, which are engaged in corresponding mortices formed on the inner periphery of the disc 43. The radial length of the disc 40 may be increased if desired.

In FIG. 8, the damper 30 is thus secured directly on to the half shell which does not have the extension 47. The block 32e is directly adhered on this same half shell. The damper 30 extends radially beyond the springs 1, and its weight 33e is made with a somewhat serpentine cross section so as to adapt it to follow the contour of the bent out ears at the edges of the windows 11. This arrangement allows the axial length of the assembly to be reduced.

It is of course possible, as an alternative, and as seen in FIG. 9, to secure the damper 30 to the other half shell. In that case, the main part of the weight 33f, with its radial flange for external fastening, is arranged radially inwardly of the block 32f.

While, in the foregoing Figures, the damper 30 was secured directly to the hub, in FIGS. 10 and 12 the damper 30 is secured to the bearing 18. To this end, the bearing 18 has a plurality of bosses 50 (as shown in FIG. 11) which engage in corresponding holes 52 formed in the damper plate 8, so as to secure the bearing 18 to the damper plate 8 with an optional clearance for rotation therewith. The bearing 18 extends around the hub 3 but is free to rotate with respect to the latter, and has at its inner periphery an annular portion 49 for axial orientation. The supports, 31g in FIG. 10, 31h in FIG. 11 and 31i in FIG. 12, are is secured, for example by crimping, to this portion.

As will be understood from the foregoing, this arrangement avoids adding the inertia of the damper 30 to that of the hub 3 so long as the clearance in the loose coupling means 12 has not yet been taken up. The springs 13 can then be given a lower value of stiffness than in the arrangements shown in the previous Figures.

Referring now to FIGS. 10 and 11, this shows two embodiments of the damper 30, identical to those shown in FIGS. 5 and 1, respectively.

In FIG. 12, the viscous damping device 40, which is identical to that shown in FIGS. 6 and 7, is again secured to the bearing 18, with the disc 43 being secured by crimping to the bearing portion 49.

The vibration damper 30 may be secured directly (as shown in FIG. 13) on to the hub 3, for example by crimping, or alternatively on to the bearing 18 (as shown in FIG. 12), which then has for this purpose a second annular portion 51 oriented radially.

By virtue of these arrangements, it will be seen that in FIGS. 12 and 13 it is only during a second stage of operation that the viscous damping means 40 operates, since in the first stage there is no relative movement between the damper plate 8 and the guide rings 4 and 5.

As has already been mentioned, the bosses 50 may extend into the holes 52 with a clearance; this enables the viscous damper to begin operating later. Similarly, the disc 43 may be provided with teeth which penetrate, with a clearance, into complementary teeth formed on the bearing 18, as can be seen in FIGS. 13 and 14. This arrangement enables the viscous damping means 40 to operate like a sliding drawer, with the facility to act during the relative angular displacement which takes place between the hub 3 and the damper plate 8. A clearance may also be provided between the tabs 46 and the spacer bars 7.

In a further modification, not shown, the viscous damping means 40 includes a plurality of fins of generally trapezoidal cross section, forming two groups mounted in a head-to-toe relationship and extending generally in radial planes passing through the axis of the assembly. Any one fin of one group is then interleaved circumferentially between two fins of the other group, in the manner described and shown for example in FIG. 4 of French published patent application FR 2 597 181A. In yet another modification, the viscous damper 40 may be mounted between the guide rings 4 and 5, radially inwardly of the springs 1.

It will be clear from the foregoing description and the drawings that the weight 33 and block 32 of the damper 30 will be dimensioned according to the application to which the clutch is to be put, in such a way that the damper 30 operates in the range of resonant frequencies of the torsion damping device mounted on the driven shaft and therefore influenced by the gearbox. In practice, the amplitudes of the vibrations at the resonant frequency are reduced; and the appearance of two resonant frequencies, in the vicinity of the natural frequency, may be envisaged.

The present invention is of course not limited to the embodiments described herein. In particular, the support 31 may be secured to the hub 3 by means of bolts or the like, for example.

Again, the resilient element may comprise a resiliently deformable arm, integrally attached through a root zone to an internal carrying element constituting the support and carrying the weight 33 at its outer periphery. As to the shape of the arm and its carrying element, reference is invited to French published patent application No. FR 2 493 446A, for example FIG. 22 of the latter: the arm may extend over more than 360 degrees in the form of a spiral. The arm may of course carry at its outer periphery the block 32 of resilient material, in such a way that the support 31 may itself be partially resilient. The resilient element may of course consist of a plurality of coil springs, each connected to a weight and also to a spacer secured to the support.

The predamper may be arranged axially between the damper plate 8 and the guide ring 5, in the manner described for example in French published patent application no. FR 2 613 800A. The damper plate 8 may be split in the manner described in French published patent application No. FR 2 566 497A.

What is claimed is:

1. A torsion damping device comprising a first part; a second part; means locating said first and second parts coaxially with each other for limited mutual coaxial rotation, said first coaxial part comprising two guide rings and means for securing said guide rings to a driving shaft for rotation therewith, and said second coaxial part including a damper plate disposed between the guide rings; a hub comprising means for securing the hub to a driven shaft for rotation of the driven shaft by the hub, the device having first mounting means mounting the damper plate on the hub for rotation therewith; resilient means disposed between said first and second parts, a median axis of said resilient means is disposed about a circumference which is coaxial with said first and second parts; damping means disposed between said first and second parts, whereby said mutual coaxial rotation is resisted by said resilient means and damping means; and means limiting the relative displacement of said parts in said mutual rotation to a predetermined value, wherein the device further includes: a dynamic vibration damper comprising a weight, a support, and at least one resilient element mounting the weight on the support; said weight is located radially inward of said median axis of said resilient means; and coupling means coupling the support to the hub for rotation with the hub, the dynamic vibration damper having a natural frequency selected to be adapted to the resonant frequency of the components mounted on said driven shaft, at least one of said first mounting means and coupling means defining a clearance such as to be taken up upon commencement of rotation.

2. A device according to claim 1, wherein the support is fixed directly to the hub.

3. A device according to claim 1, wherein the resilient element comprises a block of resilient material.

4. A device according to claim 1, further comprising a viscous damping means and means mounting the viscous damping means with respect to the hub, for rotation therewith, and defining a clearance such as to be taken up before the viscous damping means rotates with the hub.

5. A torsion damping device comprising a first part; a second part; means locating said first and second parts coaxially with each other for limited mutual coaxial rotation, said first coaxial part comprising two guide rings and means for securing said guide rings to a driving shaft to be driven in rotation by said driving shaft, and said second coaxial part including a damper plate disposed between the guide rings: a hub comprising means for securing the hub to a driven shaft for rotation of the driven shaft by the hub, the device having first mounting means mounting the damper plate on the hub for rotation therewith; resilient means disposed between said first and second parts; damping means disposed between said first and second parts, whereby said mutual coaxial rotation is resisted by said resilient means and damping means; and means limiting the relative displacement of said parts in said mutual rotation to a predetermined value, wherein the device further includes: a dynamic vibration damper comprising a weight, a support, and at least one resilient element mounting the weight on the support; and coupling means coupling the support to the hub for rotation with the hub, the dynamic vibration damper having a natural frequency selected to be adapted to the resonant frequency of the components mounted on said driven shaft, at least one of said first mounting means and coupling means defining a clearance such as to be taken up upon commencement of rotation; a bearing, second mounting means mounting the bearing to the damper plate for rotation therewith, and third mounting means mounting said support to the bearing for rotation therewith, at least one of said second and third mounting means defining a clearance such as to be taken up upon commencement of rotation, the first mounting means comprising a loose coupling means mounting the damper plate on the hub.

6. A torsion damping device comprising a first part; a second part; means locating said first and second parts coaxially with each other for limited mutual coaxial rotation, said first coaxial part comprising two guide rings and means for securing said guide rings to a driving shaft for rotation therewith, and said second coaxial part including a damper plate disposed between the guide rings; a hub comprising means for securing the hub to a driven shaft for rotation of the driven shaft by the hub, the device having first mounting means mounting the guide rings on the hub for rotation therewith; resilient means disposed between said first and second parts, a median axis of said resilient means is disposed about a circumference which is coaxial with said first and second parts; damping means disposed between said first and second parts, whereby said mutual coaxial rotation is resisted by said resilient means and damping means; and means limiting the relative displacement of said parts in said mutual rotation to a predetermined value, wherein the device further includes: a dynamic vibration damper comprising a weight, a support, and at least one resilient element mounting the weight on the support; said weight is located radially inward of said median axis of said resilient means; and coupling means coupling the support to the hub for rotation with the hub, the dynamic vibration damper having a natural frequency selected to be adapted to the resonant frequency of the components mounted on said driven shaft, at least one of said first mounting means and coupling means defining a clearance such as to be taken up upon commencement of rotation.

7. A device according to claim 6, wherein the resilient element comprises a block of resilient material.

* * * * *